Jan. 18, 1927.
L. SCHMIDT
SEED CORN NUBBER
Filed June 14, 1926
1,614,971
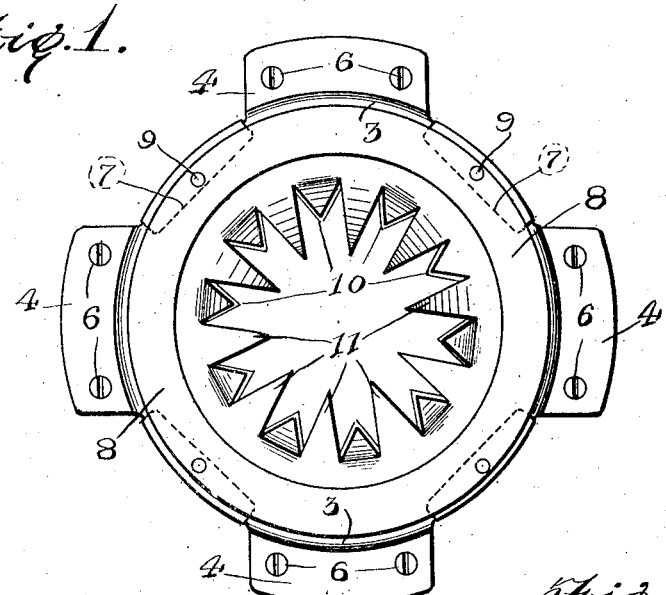
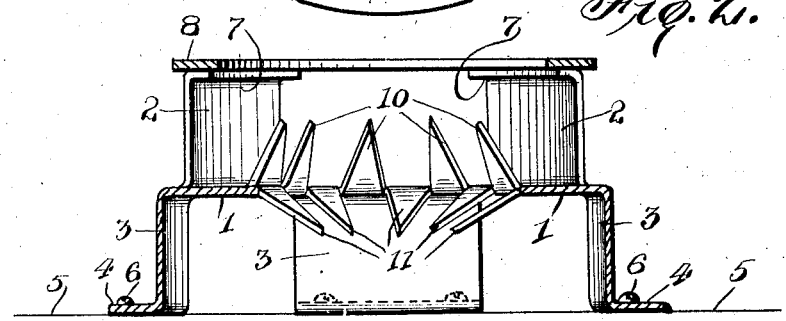
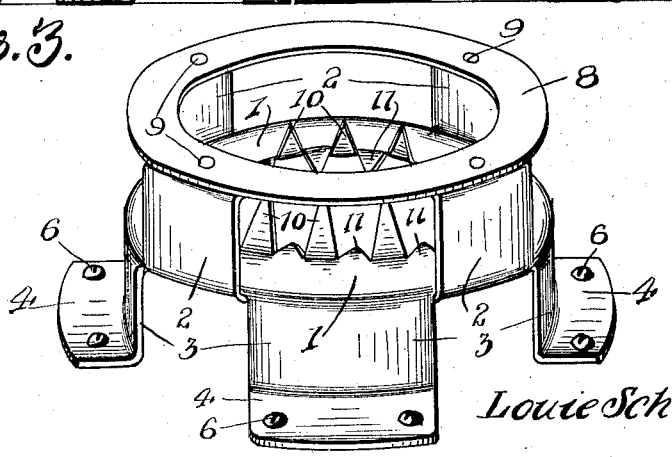
Inventor
Louie Schmidt.
By F. N. Bryant
Attorney.

Patented Jan. 18, 1927.

1,614,971

UNITED STATES PATENT OFFICE.

LOUIE SCHMIDT, OF ATLANTIC, IOWA.

SEED-CORN NUBBER.

Application filed June 14, 1926. Serial No. 115,877.

This invention relates to certain new and useful improvements in seed corn nubbers and has for its primary object to provide a device through which a spike or ear of corn is partially forced to shell off the uneven or oddly shaped kernels on the tips and butts of seed corn prior to the shelling of the seed corn in an ordinary shelling machine to separate the uneven kernels from the kernels of uniform shape.

In seed corn planting machines, the presence of the kernels of uneven shape cause uneven drilling in the corn planter and the principal object is therefore to remove such oddly shaped kernels from the spike before complete shelling thereof.

The invention relates more particularly to the novel construction of device for accomplishing the above purpose wherein the device is formed of a single piece of material.

With the above and other objects in view that will become apparent as the nature of the invention is better understood, the same consists in the novel form, combination and arrangement of parts hereinafter more fully described, shown in the accompanying drawing and claimed.

In the drawing, wherein like reference characters designate corresponding parts throughout the several views, Figure 1 is a top plan view of a seed corn nubber constructed in accordance with the present invention and showing the upwardly and downwardly directed circular series of teeth forming two central passages through the device for shelling the kernels from the butt and tip ends of a cob, Figure 2 is a vertical cross sectional view of the device showing the guide ring for the cob mounted on the upper end of the device and the kernel removing teeth, and Figure 3 is a perspective view of the device showing the entire structure thereof except the upper guide ring as being struck from a single piece of metal.

Referring more in detail to the accompanying drawing, there is illustrated a seed corn nubber designed for removing the uneven kernels from the butts and tips of seed corn prior to the complete shelling thereof to separate the uneven kernels from the kernels of uniform shape, and said device is preferably struck from sheet metal to provide a horizontal wall 1 intermediate the upper and lower ends. The blank is radially slitted to provide alternate upstanding arms 2 and depending legs 3, the lower ends of the legs being bent outwardly to provide feet 4 for anchoring to the support 5 by the fastening devices 6.

The arms 2 being arranged in spaced relation as shown in Figures 2 and 3 are bent inwardly at their upper ends to provide supports 7 for the ring 8 that is secured to the supports by the fastening devices 9. The ring 8 forms a guide for an ear of corn while the latter is being introduced into the device.

The horizontal wall 1 of the nubber is provided with a central opening concentric with the inner edge of the ring 8 while the inner edge of the horizontal wall is radially slitted to provide continuous teeth, alternate ones of which are bent upwardly as at 10 while the remaining alternate teeth are bent downwardly at 11 providing two circular series of nubbing teeth at different elevations. The upper series of teeth 10 are bent at a greater angle to the horizontal wall 1 than the lower teeth 11 with the upper teeth 10 forming a passage through the device of a diameter greater than the passage formed by the pointed ends of the lower teeth 11.

A spike or ear of corn is manually inserted into the nubber and the larger or butt end thereof is engaged by the teeth 10, and upon rotating the spike, the kernels are removed from the same by the teeth 10. Upon reversing the spike, the tip end thereof freely passes beyond the teeth 10 and is engaged by the teeth 11, the kernels being effectively removed therefrom when the spike is rotated. The spike is then ready to be delivered to the usual shelling machine.

While there is herein shown and described the preferred embodiment of the present invention, it is nevertheless to be understood that minor changes may be made therein without departing from the spirit and scope of the invention as claimed.

What I claim as new is:

1. In a seed corn nubber, a frame struck from a single blank of material and comprising an intermediate horizontal wall, upwardly directed arms and depending legs and nubber teeth carried by the intermediate wall, said teeth being arranged in two circular series with one series above the other.

2. In a seed corn nubber, a frame struck from a single blank of material and comprising an intermediate horizontal wall, upwardly directed arms and depending legs and nubber teeth carried by the intermediate wall, and a guide ring carried by the upper ends of the arms, said teeth being arranged in two circular series with one series above the other.

3. In a seed corn nubber, a frame struck from a single blank of material and comprising an intermediate horizontal wall, upwardly directed arms and depending legs and nubber teeth carried by the intermediate wall, said teeth being arranged in two circular series with one series above the other, and formed by radially slitting the horizontal wall, the teeth of each series being alternately arranged and respectively bent upwardly and downwardly with the operative ends of the lower series defining a passage of less diameter than the operative ends of the upper series.

4. In a seed corn nubber, a frame struck from a single blank of material and comprising an intermediate horizontal wall, upwardly directed arms and depending legs and nubber teeth carried by the intermediate wall, and a guide ring carried by the upper ends of the arms, said teeth being arranged in two circular series with one series above the other, and formed by radially slitting the horizontal wall, the teeth of each series being alternately arranged and respectively bent upwardly and downwardly with the operative ends of the lower series defining a passage of less diameter than the operative ends of the upper series.

In testimony whereof I affix my signature.

LOUIE SCHMIDT.